United States Patent [19]

Flanders et al.

[11] 4,136,327
[45] Jan. 23, 1979

[54] WELL SURVEY SYSTEM MODULATION TECHNIQUE

[75] Inventors: Thomas E. Flanders, Houston; Herbert E. Moore, Pauline, both of Tex.

[73] Assignee: General Electric Company, Fairfield, Conn.

[21] Appl. No.: 817,909

[22] Filed: Jul. 22, 1977

[51] Int. Cl.² .............................................. G01V 1/40
[52] U.S. Cl. .......................... 340/18 FM; 340/18 P; 340/310 A
[58] Field of Search .......... 340/18 CM, 18 FM, 18 P, 340/310 A, 310 R, 170, 207 R, 207 P, 210; 33/312; 166/66; 181/102; 175/40, 50

[56] References Cited

U.S. PATENT DOCUMENTS

| | | | |
|---|---|---|---|
| 2,368,532 | 1/1945 | Fearon | 340/18 FM |
| 2,615,956 | 10/1952 | Broding | 340/18 FM |
| 3,689,886 | 9/1972 | Durkee | 340/310 A |
| 3,696,383 | 10/1972 | Oishi et al. | 340/310 A |
| 3,737,845 | 6/1973 | Maroney et al. | 340/18 P |
| 3,938,129 | 2/1976 | Smither | 340/310 R |
| 3,959,767 | 5/1976 | Smither et al. | 340/18 P |
| 3,986,121 | 10/1976 | Oehrli | 340/310 A |
| 4,027,286 | 5/1977 | Marosko | 340/310 R |
| 4,035,763 | 7/1977 | Cowles | 340/18 FM |

FOREIGN PATENT DOCUMENTS

384087  5/1973  U.S.S.R. .................................. 340/18 R

*Primary Examiner*—Nelson Moskowitz

*Attorney, Agent, or Firm*—Raymond H. Quist; Allen E. Amgott

[57] ABSTRACT

A single pair of conductors in a drill cable in a borehole is used not only to transmit power into the hole, but to transmit control commands into the hole, and to communicate sensor data back up to the surface. A frequency for power and communication of 1 kHz is employed; but this is frequency modulated by deviation of about 5 percent to transmit commands down-hole. A different non-interfering phase modulation is used to send data back to the surface by causing a susceptance (preferably capacitive) to be connected across the supply cable to signify a binary pulse. The alteration in phase between current into the cable and potential across it is observed at the surface and the pulses so detected are processed by conventional data processing techniques. A novel coding method is used for sending commands into the hole: Each of a series of possible commands is assigned a binary value so that, for example, if commands #2 and #4 are to be sent, a total of 2 + 8 pulses (all of equal weight) forming a command word are sent down-hole where they are counted by a binary counter. When the total number has been counted, outputs #2 and #4 of the counter ($2^1$ and $2^3$) will have signals on them which constitute the transmitted orders. This method is wasteful of time-bandwidth product (which is in abundant supply in this invention's applications) but avoids problems of timing inherent in serial transmission of conventional binary signals.

2 Claims, 5 Drawing Figures

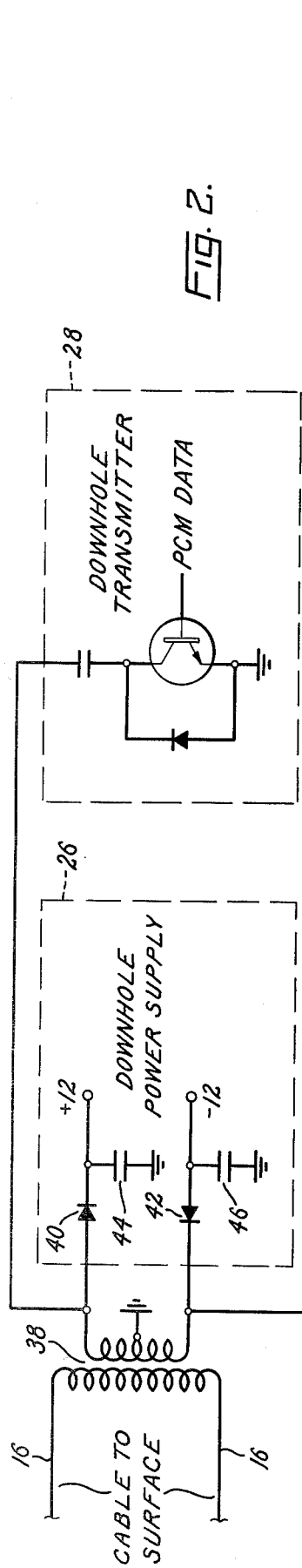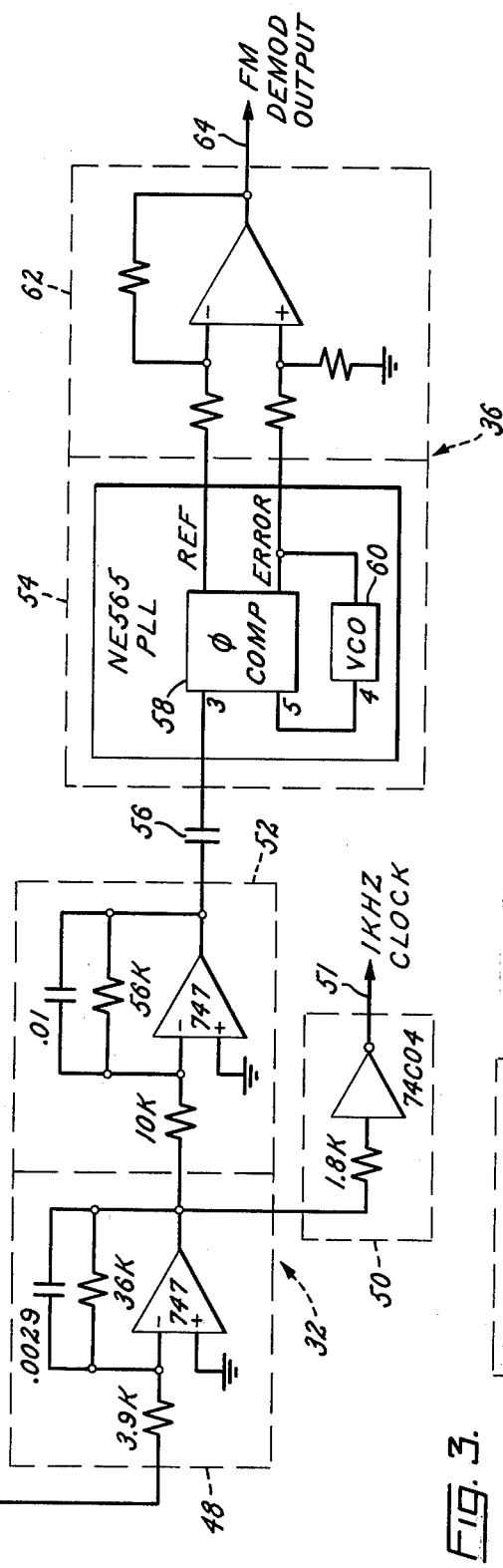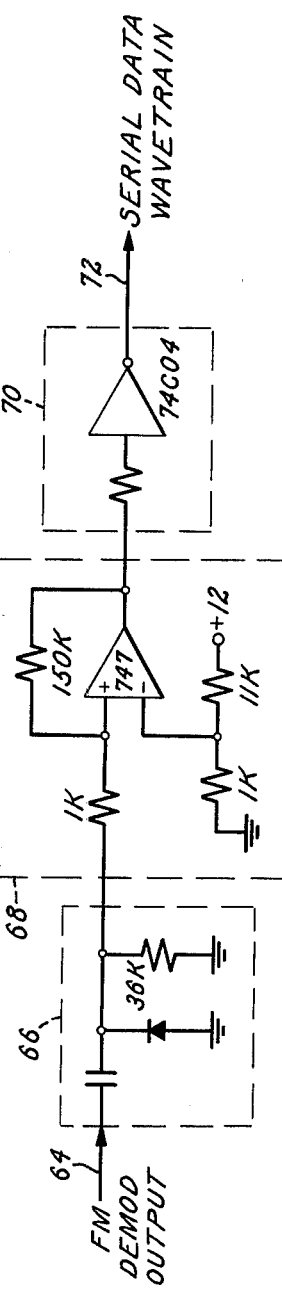
Fig. 2.
Fig. 3.

WELL SURVEY SYSTEM MODULATION TECHNIQUE

BACKGROUND OF THE INVENTION

1. Field of the Invention

This invention pertains to drilling of boreholes and more particularly to means for controlling apparatus in the borehole and to receiving information sensed by sensors in the borehole.

2. Discussion of the Prior Art

The commerical importance of petroleum exploration and the increasingly inhospitable geology which appears economically interesting have led to many schemes for determining the direction of a hole being drilled and the characteristics of the strata it is traversing. Electrical apparatus in the hole must be supplied with energy and controlled; and observations are preferably transmitted to the surface without the necessity of raising the drill, although many devices propose to record in a bore-hole recorder the readings of instruments which will be available only too late to avoid the mistakes they chronicle. The prior art teaches the use of acoustic impulses through the drill string; conductors of different number in the drill cable; carrier schemes of various sorts to relay information out of the hole; the superposition of variously identifiable pulses on sinusoidal power voltages to transmit intelligence in either direction; different schemes for multiplex or phantom circuit transmission in either direction.

U.S. Pat. No. 3,938,129 of Smither, assigned to the assignee of the present application, discloses the use of a power line to transmit data from the hole to the surface by changing the phase relation of the voltage applied and current supplied at the surface. This is done in the hole by switching a susceptance in parallel with the normal down-hole load to draw an out-of-phase current large enough to be identified at the surface as representing a binary pulse. In particular, it describes two different types of phase detectors which may be used in the present invention.

U.S. Pat. No. 3,959,767 of Smither et al., assigned to the assignee of the present application, teaches the use of phase modulation to transmit binary-coded data back from the hole to the surface, and further teaches the use of the surface power supply to control down-hole apparatus from the surface. This is done by suppressing either a positive or a negative half-cycle of the power voltage. This is detected in the down-hole apparatus.

No other art believed more nearly related to the present invention is known to the applicants.

SUMMARY OF THE INVENTION

A combined power and signal carrier of nominal 1 kHz frequency is generated by a voltage-controlled oscillator (VCO) and amplified to a convenient power level, for transmission via a single conductor pair down a bore-hole to sensing equipment in the hole. The VCO may be frequency modulated with a deviation of about five percent to convey pulse signals to the bore-hole equipment, which is provided with FM demodulation means and digital means to receive various commands. The mode of transmission of the commands is novel in that a command message consists of a string of bits of equal weight which will cause a down-hole binary counter to reach a count at which its binary output will excite appropriately the leads which would conventionally represent values of 1,2,4,8, etc. but in this invention represent command #1, #2, #3, and #4, respectively. D-c supply for the bore-hole equipment is provided by rectifying some of the 1 kHz power. Data is transmitted back to the surface by encoding it in binary digits and connecting a susceptance, preferably capacitive, across the supply line so that the power factor of the energy supplied from the surface is altered. This alteration is detected at the surface and is treated as a pulse which is then decoded as a code bit. Neither mode of transmission interferes with the other.

BRIEF DESCRIPTION OF THE DRAWINGS

FIG. 2 represents schematically the down-hole receiver, clock detector, and FM demodulator.

FIG. 3 represents schematically the means to convert the demodulated FM signal to a digital signal.

DESCRIPTION OF THE PREFERRED EMBODIMENT

Figure 1:
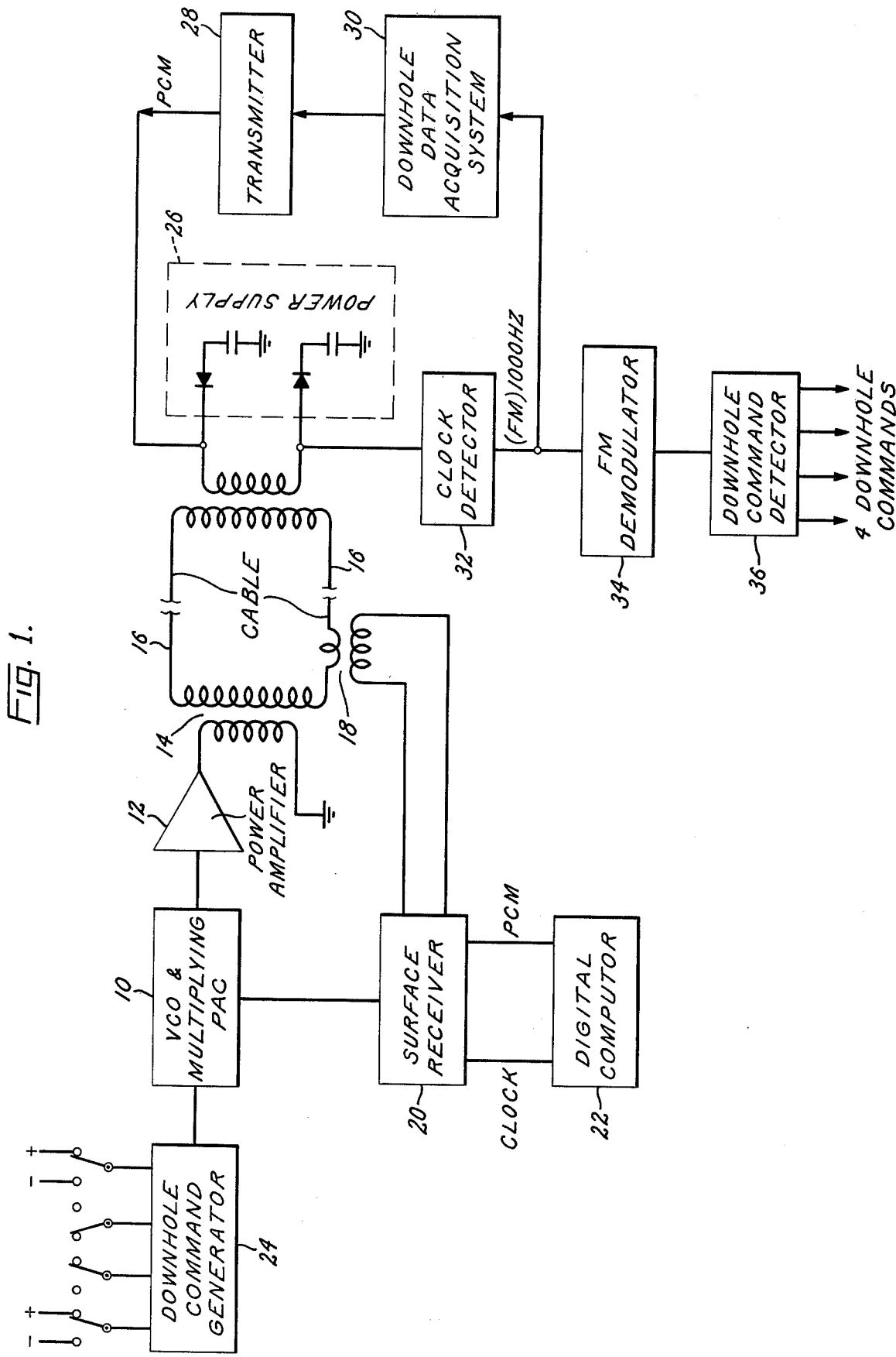
FIG. 1 represents by block diagram the embodiment of the invention.

FIG. 1 represents in schematic block diagram form the surface and downhole portions of the system as connected by a two-conductor path. A voltage-controlled oscillator 10 with a nominal or center frequency of 1 kHz drives a power amplifier 12 which feeds its output to the primary of a transformer 14 whose secondary is connected to the two-conductor path through the cable 16 running into the well hole. A current transformer 18 is connected with its primary in series with the secondary of 14 and cable 16, and its secondary connected to surface receiver 20. Surface receiver 20 is also connected to receive a potential signal from VCO 10. Its function is to determine the phase between the potential impressed on cable 16, and the current through it; changes in this phase are produced down-hole as a means of signalling to surface receiver 20. Detected signals are transmitted from receiver 20 to digital computer 22 (which also receives clock pulses from receiver 20) for decoding of the binary-encoded signal formed by the phase changes and any appropriate further processing or storage.

Control signals are sent down-hole by frequency modulation of the alternating potential applied to cable 16. In the present embodiment, four different command signals are to be transmitted, completely independently of each other to the extent that any of them may be transmitted simultaneously. This is done by sending a burst of pulses of equal weight whose total number is counted by a down-hole binary counter of four stages. If down-hole command generator 24 is envisaged as having four switches corresponding to the four commands, it is evident that any conventional arrangement which causes switch #1 to contribute one pulse, switch #2 two pulses, switch #3 four pulses, and switch #4 eight pulses, to the total in the burst will result in the down-hole counter which counts the total having its four binary output leads excited correspondingly to the number of the switch which is turned on—that is, if switch #4 is on and adds eight pulses to the total, the fourth output lead of the counter will be excited. In the present instance these will be voltage pulses of the proper amplitude to produce, when applied to VCO 10, the desired frequency deviation. This may be of the order of five percent.

The down-hole apparatus is represented in block form; since all these blocks are detailed in the remaining drawings, they will merely be enumerated: power supply 26; transmitter 28; data acquisition system 30; clock detector 32; FM demodulator 34; and down-hole command detector 36.

Referring to FIG. 2, cable 16 is connected to a transformer whose center-tapped secondary is connected to down-hole power supply 26, through diodes 40 and 42, whose outputs are connected respectively to filter capacitors 44 and 46, to produce potentials of +12 volts and −12 volts, respectively, with respect to ground for supplying these potentials to the various electronic devices of the down-hole installation. A conventional semiconductor squaring amplifier 48 is connected to one side of the secondary of transformer 38 to receive the nominal 1 kHz of the power system, which it squares and transmits through amplifier 50 as clock 51. The output of 48 is also fed to Miller integrator 52, whose output becomes a sawtooth wave which is fed to a phase-locked loop 54 via a capacitor 56. Phase-locked loop 54 contains a phase comparator 58 and a voltage-controlled oscillator 60 which, in conventional fashion receives a control or error voltage from phase comparator 58 to make its frequency follow the frequency of the input to 54, which is effectively the frequency of the output of VCO 10 on the surface. Since the error voltage is a measure of the magnitude of the deviation of the frequency of VCO 10 from its nominal unmodulated value, it is the demodulated FM signal. It is fed to a differential amplifier 62, which also receives for its other input a reference voltage from phase comparator 58 which is a measure of the amount by which potentials within phase-locked loop 54 deviate from ground, and produces an output 64 which is the demodulated FM signal at a fixed potential with respect to ground.

FIG. 3 represents output 64 being fed to a ground clamp d-c restoration circuit 66 and thence to a Schmidt-trigger circuit 68, which squares it. This squared signal is transmitted to inverter 70, which produces an output 72.

Figure 4:
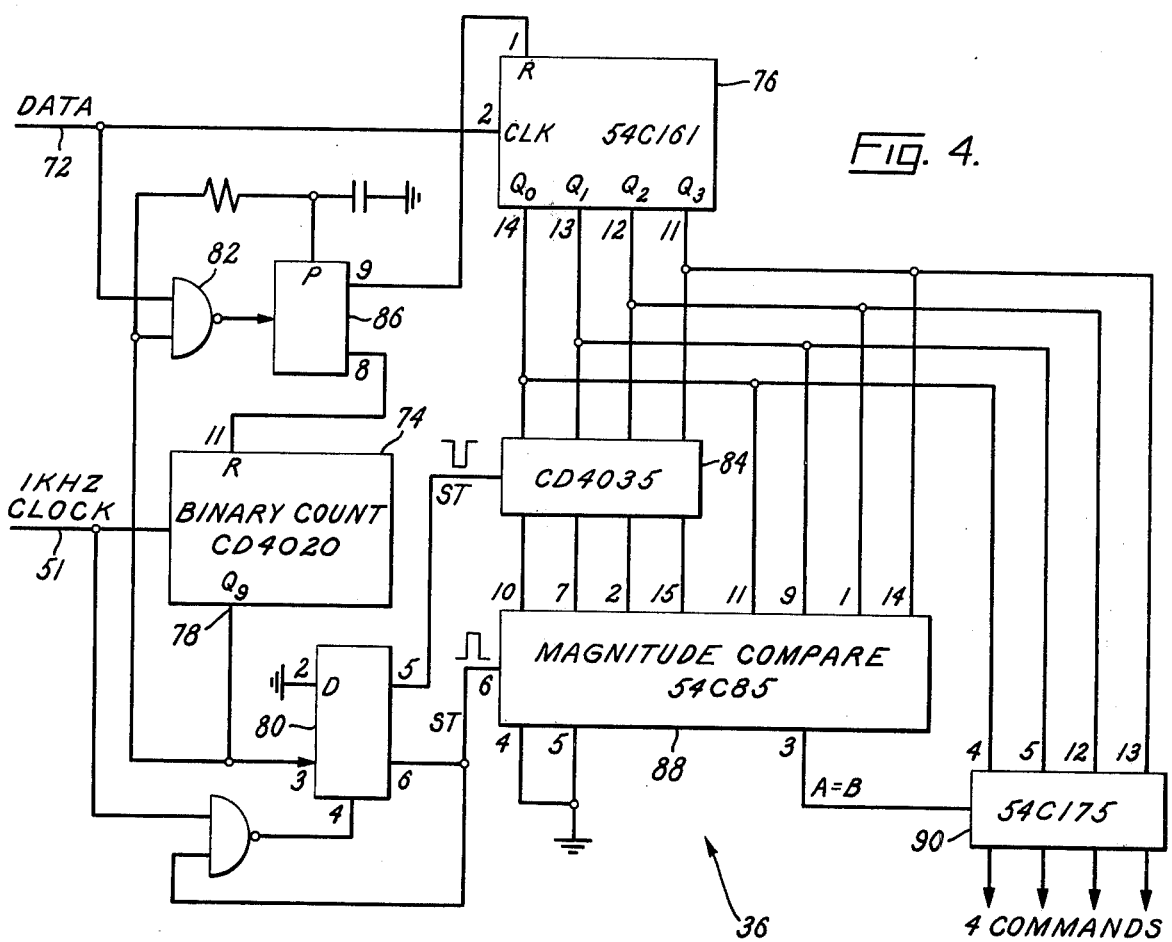
FIG. 4 represents schematically means to decode the command.

Binary counter 74 of FIG. 4 receives clock 51 by which it is stepped continously. Its maximum registration is the maximum possible number of pulses in a command signal train from down-hole command generator 24 of FIG. 1. Binary counter 76 receives the data pulses 72 and counts only the actual number of such pulses. This mode of operation has the advantage that synchronization of the counters with the actual beginning of a command word is unnecessary. If there are six pulses in the command word, and the first two arrive and are followed by a long sequence of vacancies terminated by the final four pulses, the total count is six even through the count was begun within the sequence of six. This, however, requires that two such counts be made in succession, and compared with each other before the count can be accepted as accurate, since a change in the command signal occurring during the count could lead to error. This is in fact unobjectionable, since it is only when a change in the command signal is made that this occurs. Once a given set of commands has been entered into down-hole command generator 24, it is repeated continuously until the command has been changed.

The detailed description of the system is this: When binary counter 74 reaches its maximum registration, it produces a signal at terminal 78 which triggers toggle flop 80 and enables gate 82. Toggle flop 80 produces a pulse short compared with the clock period—about 500 nanoseconds long in the present embodiment. The trailing edge of this strobes register 84 and causes it to store the then existing content of counter 76. If data pulses 72 are arriving, gate 82 triggers toggle flop 86, which resets counters 74 and 76 to zero, beginning a new count. When the next word period has passed, counter 74 again triggers toggle flop 80; toggle flop 80 also triggers comparator 88, by the leading edge of its output, so that comparator 88 compares the content of counter 76 with that of register 84. If the two are the same, the content of counter 76 is loaded into output register 90, whose four outputs are the four possible commands, which are sent to perform appropriate control functions on the controllable apparatus whose nature is immaterial to the present invention; it merely constitutes the apparatus to be controlled. The trailing edge of the output of toggle flop 80 resets counters 74 and 76 as above described. If comparator 84 finds a difference between the content of counter 76 and register 84, nothing is fed to register 90, which continues with its previous content. Register 84 receives the current content of counter 76 slightly before counter 76 is reset, so that register 84 always has the previous content of counter 76 for the next comparison.

Figure 5:
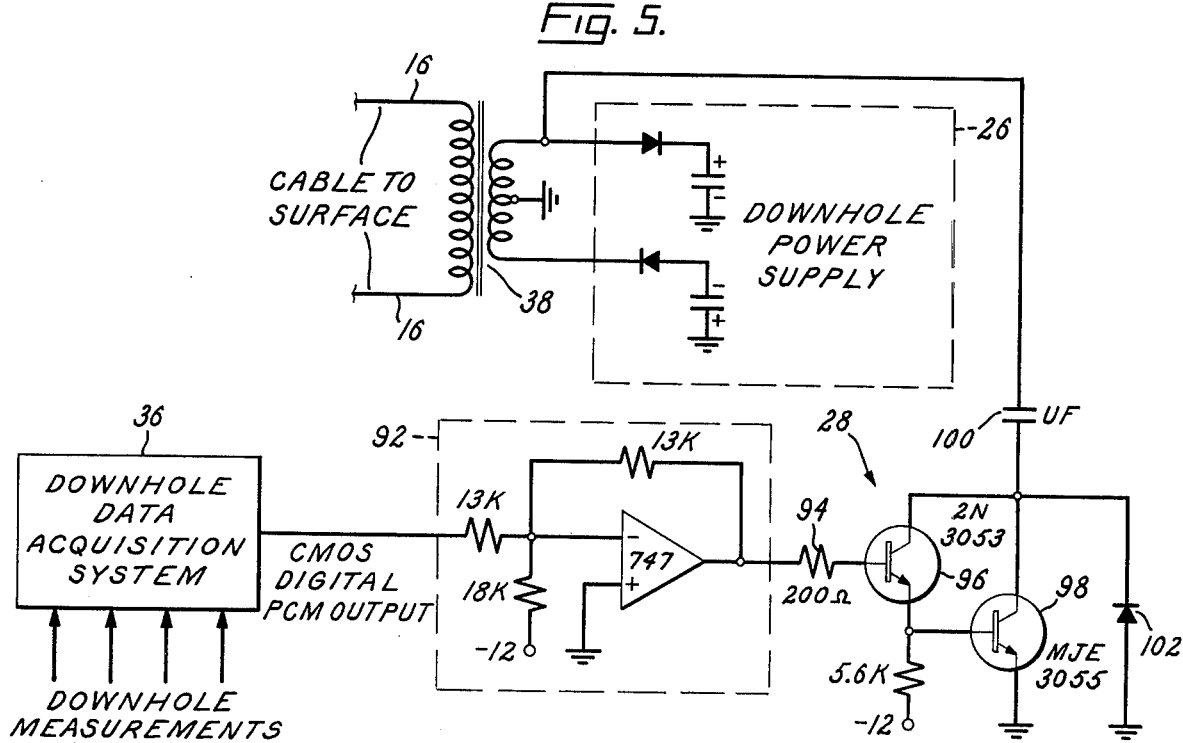
FIG. 5 represents schematically means to transmit data to the surface.

FIG. 5 represents primarily the down-hole transmitter 28. Down-hole data acquisition system 36 is represented simply as a rectangle; it is any conventional means to receive sensed data, convert it to digital form, and serialize it, and so long as it provides digital data to be transmitted is of no other consequence to the present invention. Its output is received and amplified by operational amplifier 92, which drives a Darlington type transistor circuit. The output of amplifier 92 via a resistor 94 drives the base of a transistor 96 whose emitter is connected to the base of a transistor 98. The collectors of these two transistors 96 and 98 are tied together to one side of a capacitor 100, and to the cathode of a diode 102 whose anode is grounded. The other side of capacitor 100 is tied to one side of the secondary of transformer 38. A binary zero in the data stream leaves the base of transistor 96 at zero, which causes it and transistor 98 to be turned off. Capacitor 100 is charged by the voltage from the secondary of transformer 38 to the peak voltage of the alternating current, at which it is held by diode 102, so that capacitor 100 does not have any effect. When a binary one drives the base of transistor 96 positive, it also drives the base of transistor 98 positive, and they are both turned on. They thereby discharge capacitor 100 of its stored charge. The transistors (when they are on) and the diode in effect cause capacitor 100 to be tied between ground and the terminal of the secondary of transformer 38. It is thus obtained to draw a leading current from one-half of the transformer 38 secondary, and produces a change in the overall power factor of the current drawn from the surface power supply provided by power amplifier 12.

A brief word is in order concerning the magnitude of the capacitor 100. It is required to draw a sufficiently large current to produce a change in the phase of the total current sent down-hole from amplifier 12 to be surely identifiable at the surface. If this current includes apparatus having not only a substantial drain but a possibly varying power factor of its own (such as a magnetic actuator, or a motor whose power factor varies with load and speed), then capacitor 100 must draw such a large leading current that the phase change it produces in the total current can surely be identified as due to that cause, and not a casual variation caused by the operation of other equipment.

The detection of the indicated phase change is performed by surface receiver 20 which is completely conventional in the art and so not given in detail. Surface receiver 20 is connected to VCO 10 to receive a voltage fixed in phase with respect to the voltage applied to transformer 14 by power amplifier 12. From current transformer 18 it receives a signal fixed in phase with respect to the current flowing in the conductors of cable 16. These two signals may be applied to a product detector whose output amplitude will be a function of the phase of the current in cable 16 conductors with respect to the potential applied between them. The change in the product detector output may be detected, and identified as a pulse transmitted by down-hole transmitter 28. Each such pulse is transmitted to digital computer 22, which also receives clock pulses from VCO 10, via surface receiver 20. Digital computer 22 processes the data conveyed by the pulses in any desired manner. It is to be noted that changes in the frequency of VCO 10 will not interfere with these operations, since the clock pulses and the data pulses to digital computer 22 will both change simultaneously.

Other methods of measuring phase are, of course, common in the art; for example, the zero crossings of the two signals may be detected, and the time interval between these crossings may be measured as a measure of the phase. However, it is not here required to measure phases accurately, but simply to detect comparatively gross changes in the phase; the simplest operative method for doing so will probably be preferred.

The invention disclosed employs frequency modulation of an applied voltage to send signals in one direction; and it employs phase-shift modulation to send signals in the opposite direction by means which are not hampered by the changes in frequency of the applied voltage. This combination is economical in the number of conductors required in cable 16, which has the practical advantage that these may be used also as power conductors of considerable thickness, more rugged and easily protected than would be a greater number of conductors. The novel device of transmitting command signals down-hole by a succession of pulses of equal weight facilitates the operation of the invention by eliminating the requirement for careful synchronization or timing inherent in conventional binary encoded transmission.

What is claimed:

1. The method of simultaneously transmitting from the earth's surface over the same pair of conductors power and commands to control equipment down a bore hole and receiving information signals from the bore hole which comprises the steps of
    (a) applying an alternating voltage across the said pair of conductors at the earth's surface;
    (b) providing power-using equipment in the bore hole, connected across the said pair of conductors;
    (c) modulating the frequency of the said alternating voltage to signify an impulse as part of a command signal;
    (d) in the bore hole, detecting the modulation of the frequency of the alternating voltage and decoding it as part of a command signal;
    (e) in the bore hole, altering the phase relation between the alternating voltage and the current drawn by apparatus in the bore hole; to signify an impulse as part of an information signal;
    (f) at the earth's surface, detecting the altered phase relation between the alternating voltage and the current being fed into the said pair of conductors, and decoding it as part of an information signal.

2. The method claimed in claim 1 in which the impulses recited in
    (c) thereof are all of equal logical significance, and the decoding recited in d) thereof is performed by applying the impulses in a given command signal to a binary counter whose various output leads are used to provide independent command signals, the total number of impulses in the command signal thus determining which output leads will have output signals.

* * * * *